(12) United States Patent
Hosogai et al.

(10) Patent No.: US 8,667,395 B2
(45) Date of Patent: Mar. 4, 2014

(54) METHOD AND APPARATUS FOR CREATING VIDEO GAME AND ENTERTAINMENT DEMONSTRATIONS WITH FULL PREVIEW AND/OR OTHER FEATURES

(75) Inventors: Satoru Hosogai, Sammamish, WA (US); Clark Morse, Redmond, WA (US)

(73) Assignee: Nintendo Co., Ltd., Kyoto (JP)

( * ) Notice: Subject to any disclaimer, the term of this patent is extended or adjusted under 35 U.S.C. 154(b) by 1087 days.

(21) Appl. No.: 11/207,200

(22) Filed: Aug. 19, 2005

(65) Prior Publication Data

US 2007/0060225 A1 Mar. 15, 2007

(51) Int. Cl.
*G06F 3/00* (2006.01)
*G06F 3/048* (2013.01)

(52) U.S. Cl.
USPC ............................................ 715/716; 715/838

(58) Field of Classification Search
USPC ................................................. 715/716, 838
See application file for complete search history.

(56) References Cited

U.S. PATENT DOCUMENTS

| 5,363,482 | A | 11/1994 | Victor et al. |
| 5,596,695 | A | 1/1997 | Hamada et al. |
| 5,675,752 | A | 10/1997 | Scott et al. |
| 5,675,753 | A | 10/1997 | Hansen et al. |
| 5,694,546 | A * | 12/1997 | Reisman ........................ 705/26 |
| 5,745,738 | A * | 4/1998 | Ricard ............................ 703/13 |
| 6,088,702 | A * | 7/2000 | Plantz et al. .............. 707/103 R |
| 6,100,881 | A | 8/2000 | Gibbons et al. |
| 6,161,137 | A * | 12/2000 | Ogdon et al. ................. 709/224 |
| 6,320,588 | B1 | 11/2001 | Palmer et al. |
| 6,370,562 | B2 * | 4/2002 | Page et al. ..................... 709/204 |
| 6,404,441 | B1 | 6/2002 | Chailleux |
| 6,421,058 | B2 * | 7/2002 | Parikh et al. .................. 345/522 |
| 6,453,459 | B1 * | 9/2002 | Brodersen et al. ............ 717/100 |
| 6,829,618 | B1 | 12/2004 | Abraham et al. |
| 7,010,530 | B2 * | 3/2006 | Bartkowiak et al. .............. 707/9 |
| 2002/0021272 | A1 * | 2/2002 | Zeh ................................ 345/87 |
| 2002/0049962 | A1 * | 4/2002 | Kelbaugh et al. ............ 717/128 |
| 2002/0085030 | A1 * | 7/2002 | Ghani ........................... 345/751 |
| 2002/0104019 | A1 * | 8/2002 | Chatani et al. ................ 713/201 |
| 2002/0180803 | A1 * | 12/2002 | Kaplan et al. ................. 345/810 |
| 2003/0177187 | A1 * | 9/2003 | Levine et al. ................. 709/205 |
| 2004/0233232 | A1 | 11/2004 | Iborra et al. |
| 2005/0039035 | A1 * | 2/2005 | Clowes ......................... 713/193 |
| 2005/0246745 | A1 * | 11/2005 | Hirsch et al. .................... 725/74 |
| 2006/0048092 | A1 * | 3/2006 | Kirkley et al. ................ 717/100 |
| 2006/0048132 | A1 * | 3/2006 | Chen et al. .................... 717/168 |

\* cited by examiner

*Primary Examiner* — Boris Pesin
*Assistant Examiner* — Matthew Ell
(74) *Attorney, Agent, or Firm* — Nixon & Vanderhye P.C.

(57) ABSTRACT

A computer system creates video game and movie demonstrations aids in the creation of viewable and/or playable demonstration software and storage media. Features include saving projects for demo purposes, previewing demos, previewing demo contents before creation on the final target, statistical data readouts, and directory structure updating and tracking.

14 Claims, 14 Drawing Sheets

Image Path: C:\DolphinSDK\banner.tga
Image Size: 96x32    [Open]

*DemoDisc Nintendo*

Image Size: 96x32

Format
- ◉ RGBA8
- ○ RGB5A3

Banner Type
- ◉ BNR1
- ○ BNR2

Country Code
- ○ US/JP
- ○ EU

Export Path: C:\DolphinSDK1\opening.bnr

[Export]

Input Files:
- Image Path:    C:\DolphinSDK\banner.tga    [Open]
- TPL Path:      C:\DolphinSDK\banner.tpl    [Open]
- Comment File:  C:\DolphinSDK\comment.txt   [Open]

Image Review

*DemoDisc 19 Nintendo*    [   ]    *DemoDisc 19 Nintendo*
Image            Alpha           Final

Banner Type
- ◉ BNR1
- ○ BNR2

Country Code
- ◉ US
- ○ JP
- ○ EU

Format
- ○ RGBA8
- ○ RGB5A3

Coment
- Long Title  [                    ]
- Short Title [                    ]
- Company     [                    ]

Fig. 12

METHOD AND APPARATUS FOR CREATING VIDEO GAME AND ENTERTAINMENT DEMONSTRATIONS WITH FULL PREVIEW AND/OR OTHER FEATURES

FIELD

The technology herein relates generally to creating video game and movie demonstrations. More particularly, the technology herein relates to a computer system for aiding in the creation of viewable and/or playable demonstration software and storage media. In still more detail, the exemplary illustrative non-limiting implementation provides features including saving of projects for demo purposes, previewing of demos, previewing of demo contents before creation on the final target, statistical data readouts, and directory structure updating and tracking.

BACKGROUND AND SUMMARY

The purchase price of a video game may represent a substantial expenditure for a teenager or young adult. Often, prospective purchasers may wish to experience and play a game before actually making a purchase. One way to play a game before purchase is to borrow or rent a copy of the game, or visit a friend who has already purchased the game. However, many times retailers and other sellers may wish to create excitement and opportunities to play new (and even not-yet-released) games at the point of sale, trade shows and the like.

Commonly, retailers will provide game play kiosks that prospective purchasers can use to play full or demonstration versions of video games. In some cases, retailers or others make available demos of video games that have not yet been launched or released. Such demos allow retail buyers, members of the press, and other users to play limited versions of games that will become available in the future. Just like movie previews one sees in the movie theater before a new film's release date, such game demos can create excitement and anticipation for new games.

Demonstration versions of new and existing games thus generally allow game developers and other programmers to provide a limited or "demo" copy of their work to others. Such demos can be downloaded over a network, delivered on optical or other storage media, or delivered in other ways. Since demos are typically trimmed-down versions of real games, multiple works can often be stored and presented on the same demonstration media device. This may add to the complexity of the file structure on the device, but allows for easy and efficient delivery of many previewable works to end users.

In the past, when developing game demo software for storage CD, DVD or other storage media or delivery mechanism for demonstration purposes, an author often needed to run through a manual preparation process involving, for example, editing and running a number of batch files. This process was cumbersome and time consuming, and also often led to human errors caused by entering invalid data in a text based setting file.

To add to the challenge, demos often need to be prepared on a relatively expedited basis. For example, it is not uncommon for the game developer to request demo software or storage media to be prepared relatively rapidly after the demo game programming content has been completed. This places a lot of time pressure on the person asked to create the demo.

Additionally, if an existing demo were to be modified, the whole process would often need to be repeated, increasing the total time spent on the project and the chance for error. The person creating updated versions of the demonstration software also generally needed to know the technical details of a previous version of the demo, which meant that someone who had worked on the creation of the original demonstration media had to be present or extensive documentation needed to be maintained.

It is also desirable to provide demo software, packages or disks with multimedia capabilities. For example, it may be desirable to include, on a single demo disk or other storage medium, executable game demos as well as video, movie and sound clips. While such mixed media demo disks have been known in the past, they were generally created using a relatively painstaking process of individually handling and treating each file within the multimedia presentation. It would be desirable to provide some degree of automation to make such more complicated presentations easier to create and to augment and add to.

In addition, it would be desirable when creating demo software or presentations to provide an easy and effective way to preview the demo while it is still a work in process. Using at least some past manual preparation techniques, the author needed to create the entire demo before viewing it for effect. If modifications were required, the author would need to essentially "start from scratch" by making the necessary changes and then recreating the entire demo. In certain such prior arrangements and techniques, there was no ability to select and preview particular content for preview and execution by itself. Such an iterative process could end up requiring a lot of time to complete, making the process inefficient and sometimes difficult to complete on schedule.

The illustrative exemplary non-limiting implementations provide solutions in which the user no longer has to manually run involved processes such as a lengthy series of batch files, and which provides a full preview feature. Exemplary illustrative non-limiting implementations handle file conversion and copying. The exemplary illustrative non-limiting implementations also provide error checking features, which reduces the chance of human error corrupting demonstration media.

By providing a graphical interface for the user, the exemplary illustrative non-limiting implementations reduce or eliminate the need to manually edit text based setting files with a text editor.

Also, since the exemplary illustrative non-limiting implementations track changes made by the user, build and preview times are greatly reduced, as only files that have been edited since the last update need to be updated.

The exemplary illustrative non-limiting implementations also allow a user to preview all aspects of art resources on the demonstration media, thereby allowing the user to ensure that the proper art has been selected and loaded. The exemplary illustrative non-limiting implementations let the user preview the demonstration media as well, either in whole part or in segments, which adds to the accuracy of the demonstration media's contents.

The exemplary illustrative non-limiting implementations can also provide statistical readouts of available and used media space, so the user knows how much more content they can add to their demonstration media project.

Further exemplary illustrative non-limiting advantageous features include:
  creation of demo disk projects that can be saved and loaded
  creation of demo disk directory structures to store some or all content files for a demo disk project
  instant previewing of created demo disks by pushing a button building of proprietary video game platform or other disk images previewing all image files during the editing process (screenshots, logos, controller screen and banners)

previewing sound effects and background music arrangement and ordering of demo disk content files statistical data table that shows used and available disk space before image creation saving of statistical data for easy viewing registering all resource files for a demo project and previewing resources (playable demos and movies)

use of a number of sub programs for demo disk creation, and calling them automatically for the user so he or she does not need to edit and run lengthy batch files.

demo project creation process is faster since running batch files from dozens of folders is no longer required (the user can now simply press a button and the tool will handle all the conversion and copying).

BRIEF DESCRIPTION OF THE DRAWINGS

These and other features and advantages will be better and more completely understood by referring to the following detailed description of exemplary illustrative non-limiting implementations in conjunction with the drawings, of which:

FIG. 12 is an example of a graphic interface of an opening banner tab of a program of an exemplary illustrative non-limiting implementation;

DETAILED DESCRIPTION

Figure 1:
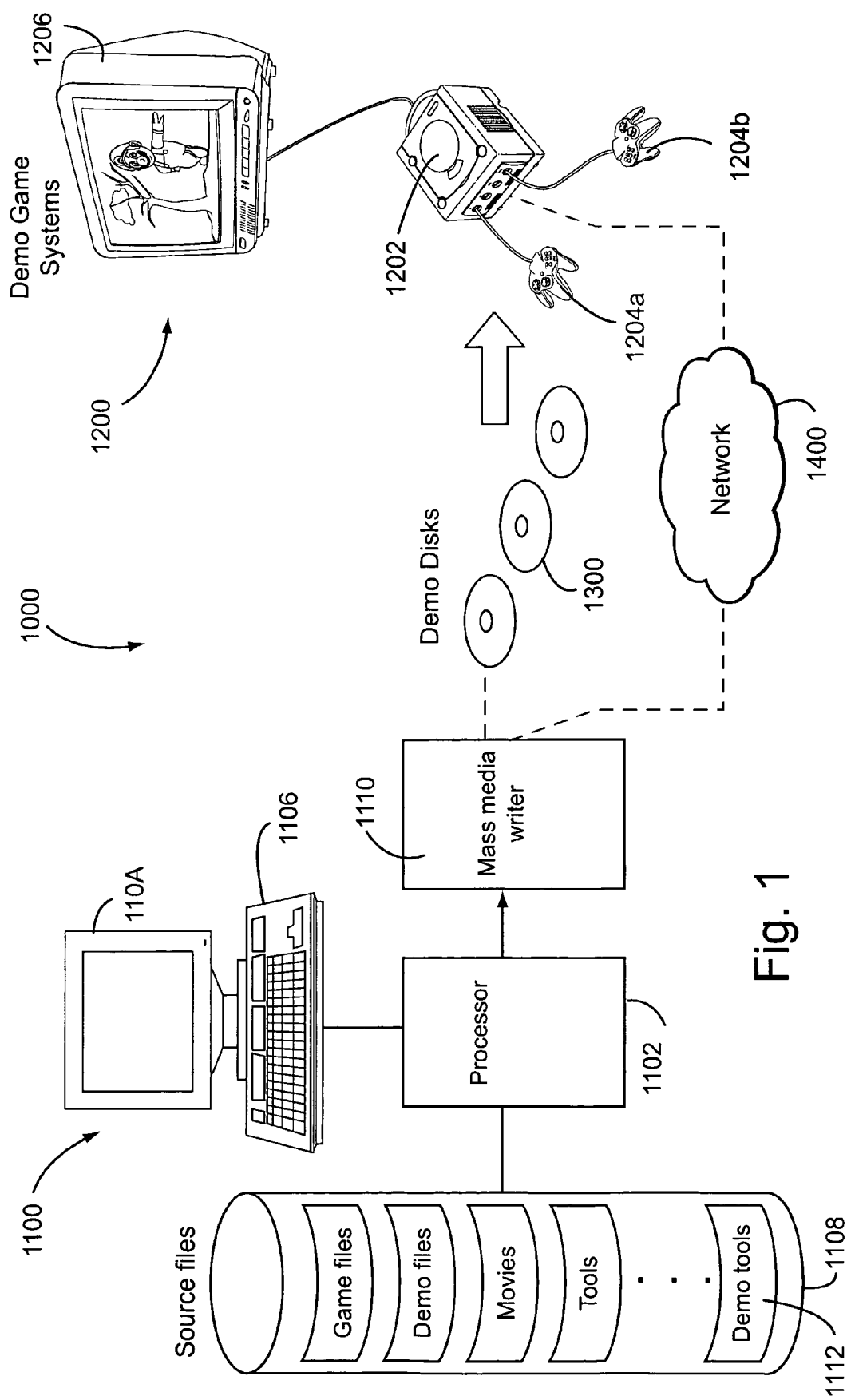
FIG. 1 shows an illustrative non-limiting exemplary implementation of an overall demo authoring and viewing arrangement.

FIG. 1 shows an exemplary illustrative non-limiting implementation of a demo authoring and viewing arrangement 1000. Arrangement 1000 includes one or more authoring stations 1100 and one or more viewing stations 1200.

In the example shown, authoring station 1100 may comprise a conventional personal computer or other development environment including a processor 1102, a display 1104, a user input device such as a keyboard 1106, a mass storage device 1108, and a mass media writer or other communications interface 1110. Mass storage device 1108 may store source files, demo files, movie clips and tools—including an executable demo creation tool 1112 described below. Authors operate authoring station 1100 to create demos that are delivered to viewing stations 1200 for viewing. Delivery may be on storage media 1300 such as optical disks and/or downloaded over a network 1400 and/or via any convenient method.

In one exemplary illustrative non-limiting implementation, authoring station 1100 may comprise a Pentium 3.1 GHz (or better) personal computer including 128 MB of RAM, Windows 2000/XP OS, Net Framework redistributable version 1.1 or above, Direct X 9.0 runtime or above, NPDP-GDEV Nintendo Gamecube Development system, Nintendo GameCube Software Development Kit, and Cygnus command line application GNUPro Toolkit. Other configurations for different gaming platforms and viewing stations are possible.

Viewing stations 1200 may comprise for example a modified or unmodified view game playing system such as a Nintendo GameCube, Nintendo DS, Nintendo Revolution, a personal computer or other video game playing platform. An exemplary viewing station 1200 includes user input devices 1204a, 1204b such as handheld controllers (wireless, wired and/or tethered) that allow users to interact with the demo. Demo results are displayed on a display 1206.

In one particular illustrative non-limiting example, viewing station 1200 can comprise a walk-up kiosk within a suitable housing that suspends controllers 1204 at a convenient height such that gamers can walk up to the kiosk, select between different demos based on an onscreen displayed menu, and then play game demos, watch movie clips, or see other demo or promotional presentations. Such kiosks can be installed at retail (point of sale) outlets, trade shows, and other locations. However, other configurations for viewing station 1200 are also possible. For example, viewing station 1200 could comprise a personal computer (with or without emulator software) connected to the Internet, or it might comprise a conventional home video game system.

In the exemplary illustrative non-limiting implementation, authoring system 1100 executes a demo tool 1112 that allows an author to simply and easily create and preview demos. The exemplary illustrative non-limiting demo tool is menu based and does not require great amounts of skill or expertise to operate. Even relatively untrained computer operates can operate the exemplary illustrative non-limiting implementation of demo tool 1112 to create and preview demos efficiently without having to go through a number of complicated manual steps.

The exemplary illustrative non-limiting demo project builder application or tool 1112 makes demo project creation more expedient in a number of ways. The tool 1112 provides a graphical user interface for the user so they can push buttons to create a demo project rather than manually editing text based setting files. The exemplary tool 1112 also tracks changes the user makes both in the application and to files on the mass storage device. With this feature, building or previewing demo projects is tremendously faster as only files that were changed since the last update will be updated. The exemplary illustrative non-limiting tool 1112 also allows for saving and loading of project files so the user may work on a project, save the project, and then come back to work on the project at a later time. Demo projects often update their contents quite frequently during a development cycle so being able to load previous work and modifying only the contents that have changed can save a lot of time. The exemplary illustrative non-limiting implementation of tool 1112 also provides previewing of all aspects of demo art resources including for example banner images, screenshot images, logo images and sound effects files before building the completed demo. The exemplary illustrative non-limiting tool 1112 also allows the user to preview the demo project they are making in its entirety or in selected segments, which greatly aids in the accuracy of the contents of the file demo. The tool 1112 can also give statistical readouts of available and used disk space to the author knows how much more content they can add to their demo disk project.

Figure 2:
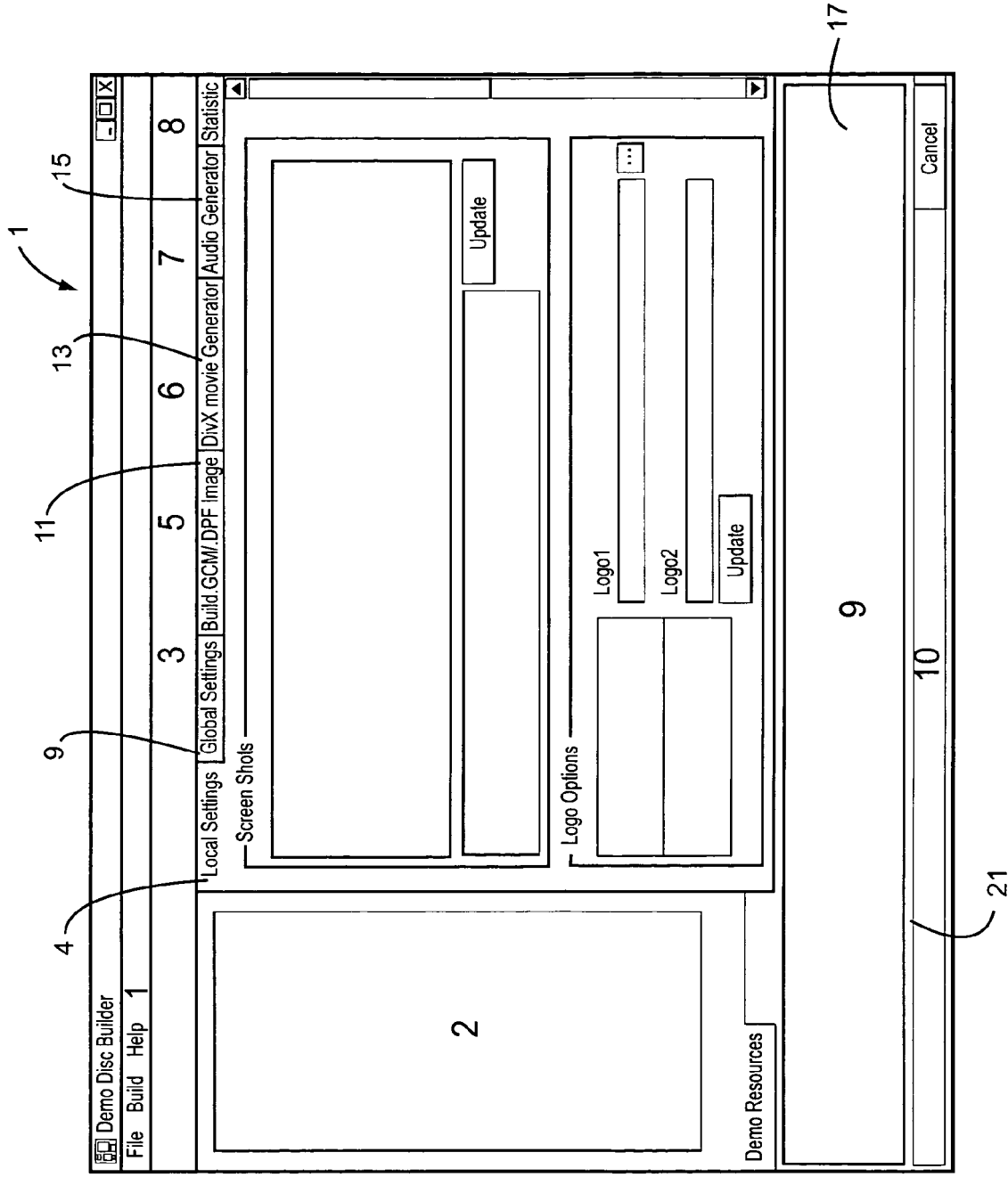
FIG. 2 is an example of a main application window of the program of an exemplary illustrative non-limiting implementation.

FIG. 2 shows an exemplary illustrative non-limiting main menu for demo tool 1112. In the exemplary illustrative non-limiting implementation, when the program is processed, a main application window 1 appears on the display of the authoring station 1100. In an exemplary illustrative non-limiting implementation, the main application window 1 has a main menu 3, a resource list 5, a local settings tab 7, a global settings tab 9, a build image tab 11, a movie generator tab 13, an audio generator tab 15, a statistics tab 17, an output window 19, and a progress bar 21.

In an exemplary illustrative non-limiting implementation, the main menu 3 has three parts (shown in detail in FIGS. 3A, 3B, and 3C), and those parts can be accessed to provide drop down menus for performing functions such as saving and loading of the project, adding of new demonstration files, adding of new movie files, previewing of demonstration media, generation and updating of the demonstration media directory structure, building of the demonstration media image files, accessing of help files. Additionally, any other suitable functions may be added to the drop down menus or as one or more additional drop down menus.

In this illustrative non-limiting implementation, the resource list 5 shows all playable demonstration and movie files that are going to be used in the current build. Some of the user interface options for interaction with the resource files are add, delete, reorder, or disable. Other suitable functions may be added.

There are also a series of tabs 7, 9, 11, 13, 15, 17 provided in this exemplary non-limiting implementation for access to various features. Clicking on a tab brings up the graphic interface corresponding to the tab title. For example, clicking on the global settings tab 9, would bring up the graphic interface for global settings. Additional tabs may be added to provide access to additional functionality.

In this exemplary non-limiting implementation, the output window 19 displays information about generated demonstration media files during project updates, builds, etc. The output window 19 may also show successful updates and warning messages about missing files or other problems. The contents of the output window 19 may be saved to a file or cleared to make way for new information.

Additionally, in this exemplary illustrative non-limiting implementation, the progress bar 21 displays when something is saving, loading, or being generated. The progress bar 21 also may display during directory structure updating, cancellation of saving/loading/updating, and during any other suitable time.

Figure 3A:
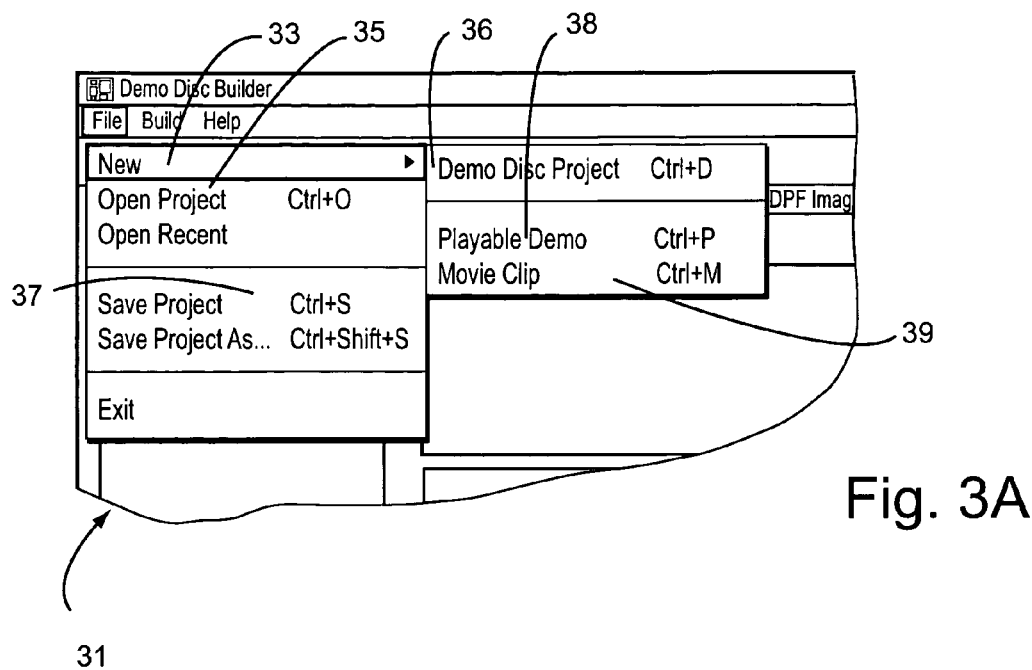
FIG. 3A is an example of a file drop down menu of the program of an exemplary illustrative non-limiting implementation.
Figure 3B:
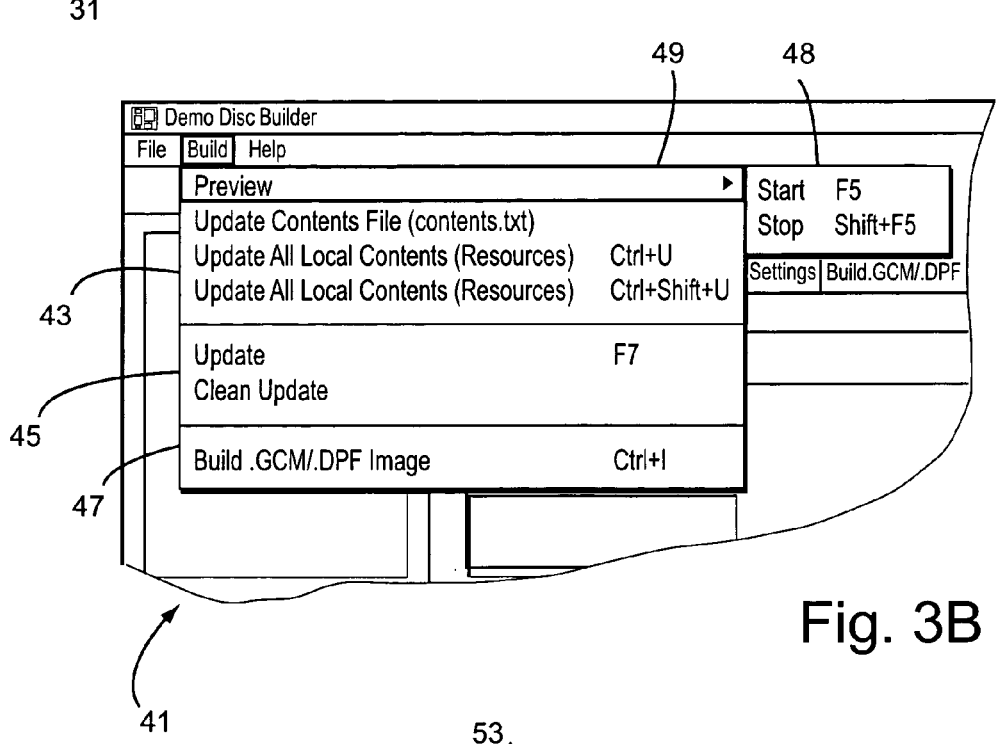
FIG. 3B is an example of a preview and build drop down menu of a program of an exemplary illustrative non-limiting implementation.

One aspect of the main menu 3 may be a file menu. An example of a file menu is shown in FIG. 3A. In this example of a file menu 31, the file menu has options for creating a new project 33, opening a saved project 35, and saving a project 37. Other suitable options may be added.

When a new project is selected for creation, additional options become available to the user, in the present exemplary illustrative non-limiting implementation. The user can chose to create a demo disc project 36, import a playable demo 38, or import a movie clip 39. Any other commands suitable for the creation or importation of files may be added.

If, in this exemplary illustrative non-limiting implementation, the user chooses to create a demo disc project 36, the program of the present non-limiting implementation will be reset to default values. If the user chooses to import a playable demo 38 or import a movie clip 39, the file corresponding to the imported demo or movie clip will appear in the resource list 5.

If the user chooses the open project option 35, the user can access a previously saved project. The save project options 37 allow the user to save the file under the old file name or a new file name.

The main menu 3 may also contain a build menu. FIG. 2B shows one example of such a build menu 41. In this build menu 41, there are options for updating varying contents 43, updating a project 45, building an image 47, and previewing 49. If other commands suitable to a build menu are developed or desired, those commands may be added to this menu.

If the user chooses the preview option 49, in this exemplary illustrative non-limiting implementation, a menu providing start and stop commands is made available. These commands operate respectively to start and stop the preview. Other commands pertaining to the operation of a preview may be added.

Selecting update contents file from the update contents 43 option allows the user to, in this exemplary illustrative non-limiting implementation, update a contents file with the projects current resources. The update all local contents, in this exemplary illustrative non-limiting implementation, allows the user to update all files that are generated as a result of the settings under the local settings tab. Only files that have had a content change since the last update are updated. Possible folder contents generated by this command include:

The project and root folders
All local content folders
A screenshot file
A local file for each resource that can override the global settings for any given resource
A manual file for all playable resources
A contents file
An integrated file that contains all local settings specified for each resource bundled with the global settings Finally, in this exemplary illustrative non-limiting implementation, the update all global contents option allows the user to update all global settings in the global settings tab. As with the update local contents option, only files that have had a content change since the last update are updated. Possible files that are updated by this option include:

The project and root folders
A converted banner file
An integrated file that contains all local settings specified for each resource bundled with the global settings In this exemplary illustrative non-limiting implementation, there are also options for updating a project. One option that may be available for updating the project is an option called update in this exemplary illustrative non-limiting implementation. This option generates all global and local content files for the current project. Only files that have had a content change since the last update are updated. Contents that a possibly generated by this command include:
- Project and root folders
- Local content folders for each resource
- Logo files for each resource
- A screenshot file for each resource
- A local file for each resource that can override the global settings for any given resource
- A manual file for all playable resources
- A contents file
- A converted banner file
- An integrated file that contains all local settings specified for each resource bundled with the global settings Another option, in this exemplary illustrative non-limiting implementation, on the updating a project menu 45, is a clean update option. This option updates all files, not only the ones that have been altered since the last updated. Possible contents generated by this command include:
- Project and root folders
- Local content folders for each resource
- Logo files for each resource
- A screenshot file for each resource
- A local file for each resource that can override the global settings for any given resource
- A manual file for all playable resources
- A contents file
- A converted banner file
- An integrated file that contains all local settings specified for each resource bundled with the global settings Alternatively, the user can select a build image command in this exemplary illustrative non-limiting implementation. This command converts the current project into a disc image.

Figure 3C:
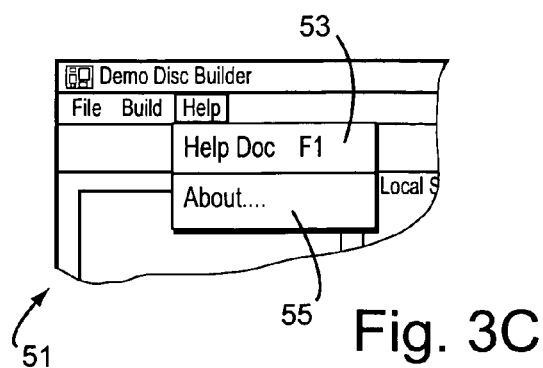
FIG. 3C is an example of a help drop down menu of a program of an exemplary illustrative non-limiting implementation.

Another menu that may be contained in the main menu 3 is a help menu. In FIG. 3C, one such help menu 51 is shown. This example of a help menu 51 provides access to help documentation and access to programmer information. Other suitable options may be added.

Figure 4:
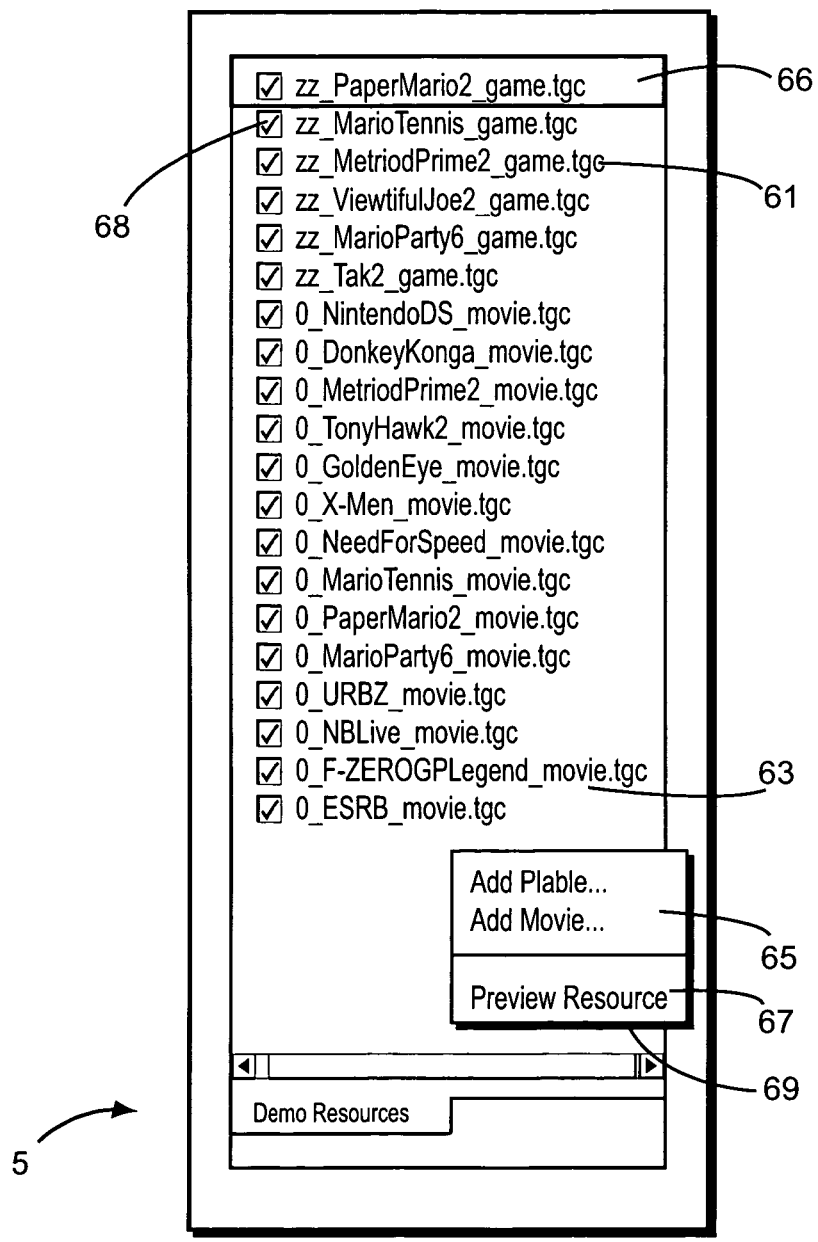
FIG. 4 is an example of a resource list window of a program of an exemplary illustrative non-limiting implementation.

FIG. 4 shows one example of a resource list 5 populated with a series of playable demo programs 61 and viewable movie clips 63. A menu 69 in the resource list provides several options in this exemplary illustrative non-limiting implementation. The user can add files 65 or preview files 67.

If the user elects to add files, in this exemplary illustrative non-limiting implementation, the user is given the option to add a playable file or a movie file. Other suitable file addition options may alternatively be included in this portion of the menu.

If the user would like to preview a file, the user can select a resource by clicking on the resource to select it with a rectangle 66 and right-clicking to bring up the menu showing the preview option 67. By clicking on the preview option 67, the user will be able to preview the selected file.

The check boxes 68, allow the user to enable or disable resources in this exemplary illustrative non-limiting implementation. Resources whose boxes 68 are checked are enabled and resources whose boxes 68 are unchecked are disabled.

The user can also, in this exemplary illustrative non-limiting implementation, change the order of resources by selecting the resource by clicking on it to generate the selection rectangle 66 and using the arrow keys to move the resource up or down in the list.

In this exemplary illustrative non-limiting implementation, the user can delete a resource by selecting the resource and pressing the delete key on the keyboard.

Figure 5:
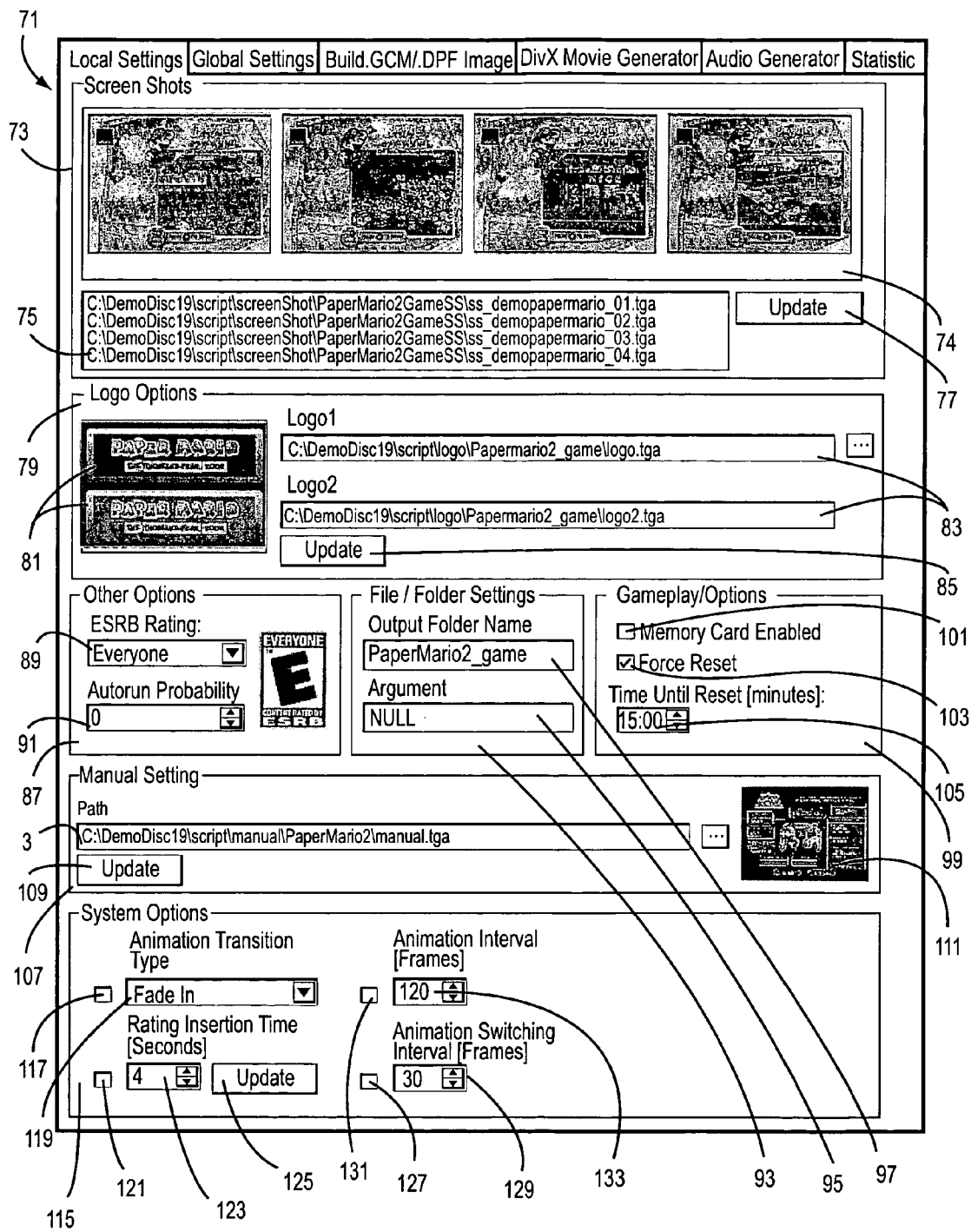
FIG. 5 is an example of a graphic interface of a local settings tab of a program of an exemplary illustrative non-limiting implementation.

FIG. 5 shows one example of a graphic interface 71 of a local settings tab in an exemplary illustrative non-limiting implementation. The graphic interface of this exemplary illustrative non-limiting implementation contains a screenshots section 73, a screenshot display 74, a box displaying screenshot paths 75, a screenshot update button 77, a logo options section 79, logo preview windows 81, logo file locations 83, a logo update button 85, an other options section 87, and ESRB rating selection box 89, an autorun probability selection box 91, a file/folder settings section 93, an argument box 95, an output folder name box 97, a gameplay options section 99, a memory card enabled check box 101, a force reset check box 103, a time until reset selection box 105, a manual settings section 107, a manual settings update button 109, a manual settings graphic 111, a manual settings file path 113, a system options section 115, an animation transition check box 117, an animation transition selection box 119, a rating insertion time check box 121, a rating insertion time selection box 123, a system options update button 125, an animation switching interval check box 127, an animation switching interval selection box 129, an animation interval frames check box 131 and an animation interval selection box 133.

In this non-limiting implementation, the user can preview screenshots in the screenshot display 74 of the screenshot section 73. The user can see the file paths of the screenshots in the box 75 and can add screenshot file paths to this box by right clicking on the box and adding a path from a pop-up menu (not shown). Once the desired screenshots have been added, the user can click the screenshot update button 77 to update the project with the desired screenshots.

In the logo options section 79 of this illustrative non-limiting implementation, the user can preview the selected logos in the logo preview windows 81. File paths for the logos can be entered in the logo file location boxes 83. The logo update button 85 can be clicked to update the project with the selected logo files.

Another section of this exemplary illustrative non-limiting implementation, the other options section 87, allows the user to select a desired rating in the ESRB rating selection box 89. The user can also set an autorun probability for a movie resource in the autorun probability selection box 91, specifying the probability that any given movie resource will run.

This exemplary illustrative non-limiting implementation also includes a file/folder settings section 93. In the file/folder settings section 93, the user can specify an output folder name in the output folder name box 97, and can specify an arguments setting that is currently used in an argument box 95.

A gameplay options section 99 in this exemplary illustrative non-limiting implementation, allows the user to check a memory card enabled check box 101 to enable a memory card, check a force reset check box 103 to force a game reset, and to select an amount of time, in a time until reset selection box 105, which dictates how much time between forced resets.

The user can also specify manual settings in this exemplary illustrative non-limiting implementation, by using the manual settings section 107. Manual settings allow the user to specify the manual graphic to use when displaying controller button configurations to a player. The file path of the manual display graphic is shown in the manual settings file path 113. The manual settings update button 109 allows the user to update the project with the selected graphic, and the selected graphic is displayed in the manual settings graphic 111.

In this exemplary illustrative non-limiting implementation, the user can access a system options section 115. This section contains miscellaneous local settings for the resource that will override the default settings. Four check boxes 117, 121, 127, and 131 allow the override of four different variables in this exemplary illustrative non-limiting implementation. The animation transition type check box 117 allows the user to select a new animation transition for this resource in the animation transition selection box 119. The rating insertion time check box allows the user to select a new rating insertion time for this resource in the rating insertion time selection box 123, the animation switching interval check box 127 allows the user to specify a new animation switching interval in the animation switching interval selection box 129, and the animation interval check box 131 allows the user to specify a new animation interval in the animation interval selection box 133. The system options update button 125 allows the user to update the project with the system options selected for the resource.

Figure 6:
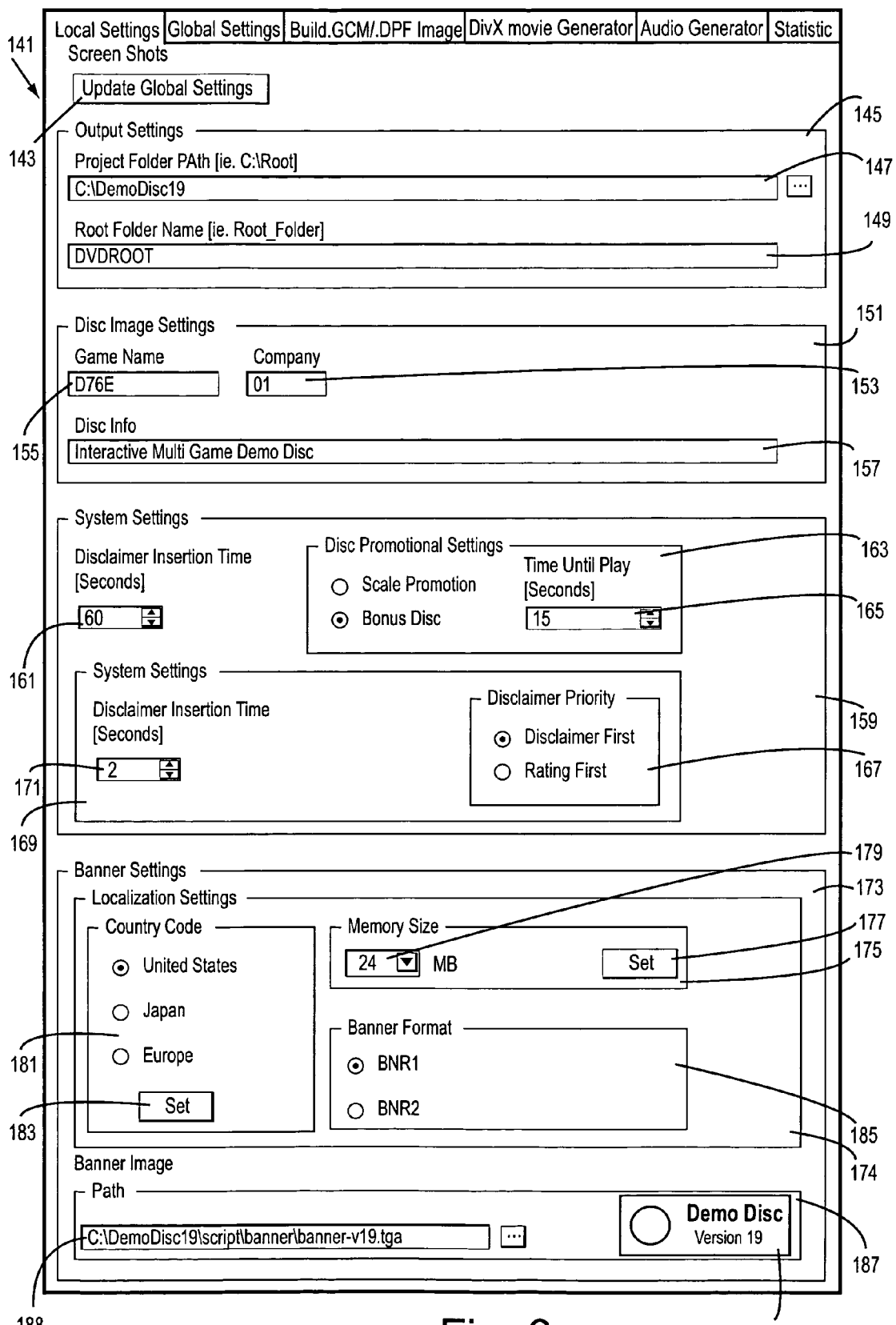
FIG. 6 is an example of a graphic interface of a global settings tab of a program of an exemplary illustrative non-limiting implementation.

FIG. 6 shows one example of a graphic interface 141 of a global settings tab in an exemplary illustrative non-limiting implementation of the present non-limiting implementation. The graphic interface, in this exemplary illustrative non-limiting implementation, contains an update global settings button 143, and output settings section 145, a project folder file path box 147, a root folder name box 149, a disc image settings section 151, a game name box 155, a company box 153, a disc info box 157, a system settings section 159, a disclaimer insertion time selection box 161, a disc promotional settings section 163, a time until auto play selection box 165, a disclaimer priority section 167, a ratings settings section 169, a rating insertion time selection box 171, a banner settings section 173, a localization settings section 174, a memory size section 175, a memory size set button 177, a memory size selection box 179, a country code section 181, a country code set button 183, a banner format section 185, a banner image section 187, a banner image file path box 188, and a banner image preview window 189.

In this exemplary illustrative non-limiting implementation, clicking the update global settings button 143, will update the global settings with the set information.

The output settings section 145, as provided in this exemplary illustrative non-limiting implementation, has a project folder file path box 147 for specifying the file path of the current project. The user can also specify the name of the root folder in the root folder name box 149.

In the disc image settings section 151 of this exemplary illustrative non-limiting implementation, the user can specify a name for the game in the game name box 155, a name for the company in the company box 153, and disc information in the disc info box 157.

There is also a systems settings section 159 in this exemplary illustrative non-limiting implementation, in which the user can set disclaimer insertion time in the disclaimer insertion time selection box 161. In the disc promotional settings section 163, the user can specify whether this is a sales promotion or bonus disc, and set a time until auto play in the time until auto play selection box 165. The user can specify ratings settings in the ratings settings section 169, selecting the amount of time that ratings are inserted in the rating insertion time box 171 and setting a disclaimer priority in the disclaimer priority section 167.

Also provided in this exemplary illustrative non-limiting implementation is a banner settings section 173. In the banner settings section 173 of this exemplary illustrative non-limiting implementation, the user can access a localization settings section 174, and a banner image section 187. Within the localization settings section 174, there is a country code section 181, a memory size section 175, and a banner format section 185.

In the country code section 181 of this exemplary illustrative non-limiting implementation, the user can select which country this demonstration media project is designed for, and click the country code set button 183 to set the settings for the selected country.

The memory code section 175 of this exemplary illustrative non-limiting implementation allows the user to set the amount of memory used when previewing demonstration media onto another display. The amount of memory to be used can be selected in the memory size selection box 179, and the selected value can be set by clicking the memory size set button 177.

The banner format section 185 allows the user to chose between multiple banner formats in this exemplary illustrative non-limiting implementation.

The banner image section 187 of this exemplary illustrative non-limiting implementation allows the user to specify a banner image file path in the banner image file path box 188 and to preview the selected banner file in the banner image preview window 189.

Figure 7:
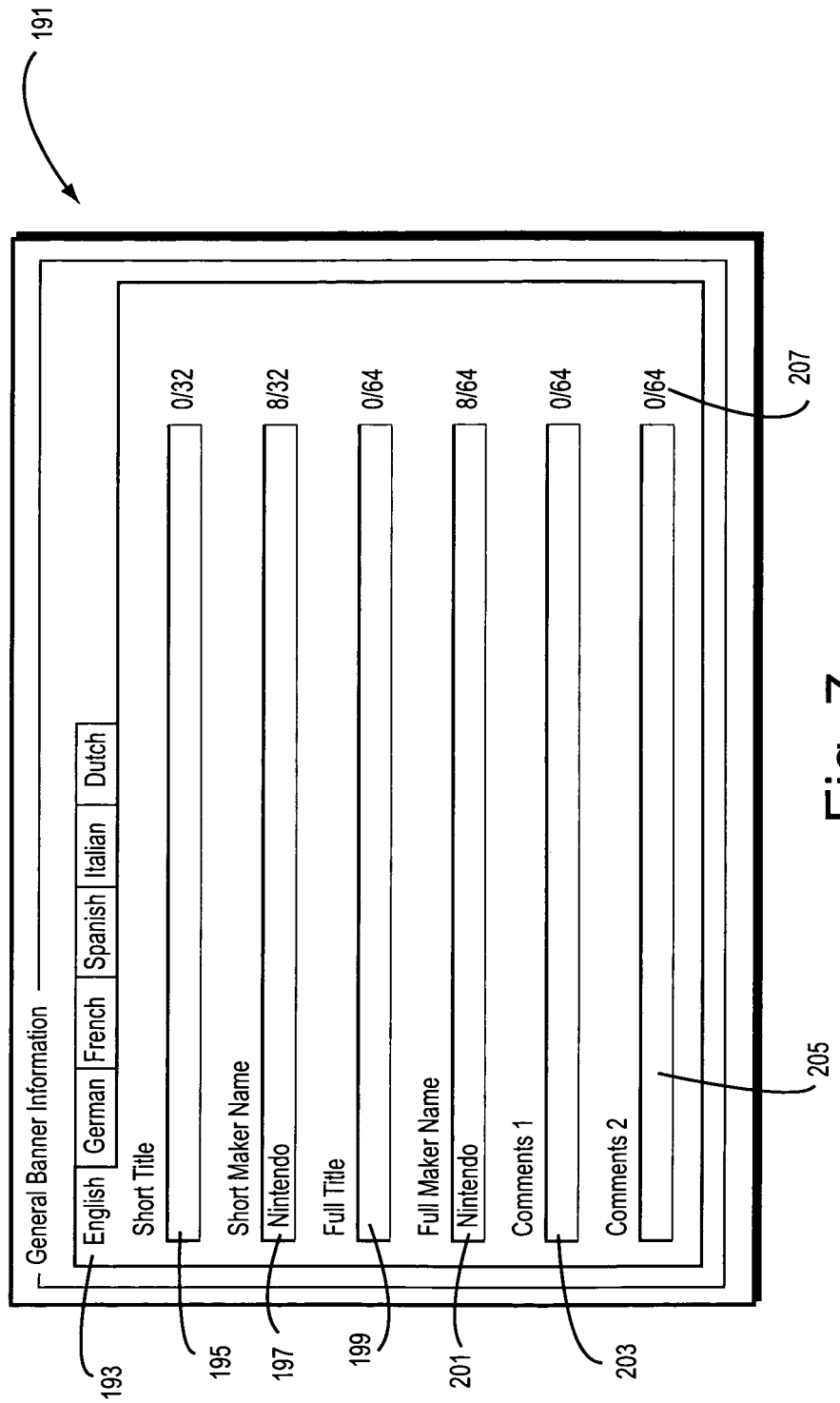
FIG. 7 is an example of a general banner information graphic interface of a program of an exemplary illustrative non-limiting implementation.

FIG. 7 shows an example of a general banner information graphic interface 191 of a program of one exemplary illustrative non-limiting implementation of the present exemplary non-limiting implementation. In this exemplary non-limiting implementation, the graphic interfaces has tabs showing different language choices. Under each language choice tab are a series of selections 195, 197, 199, 201, 203, 205.

In the short title box 195 the user can enter a short title for the demonstration media. In the short maker name box 197, the user can enter a short version of the demonstration media owner's name. Full versions of the title and the owner's name can be entered in the full title box 199 and full maker name box 201 respectively. This illustrative non-limiting implementation also has two comment boxes 203, 205 for commentary. The number of characters currently in each box and available for each box is shown by box numbers 207. The number before the "/" is the current number of characters and the number following the "/" is the total number of characters that can be typed in the box.

Figure 8:
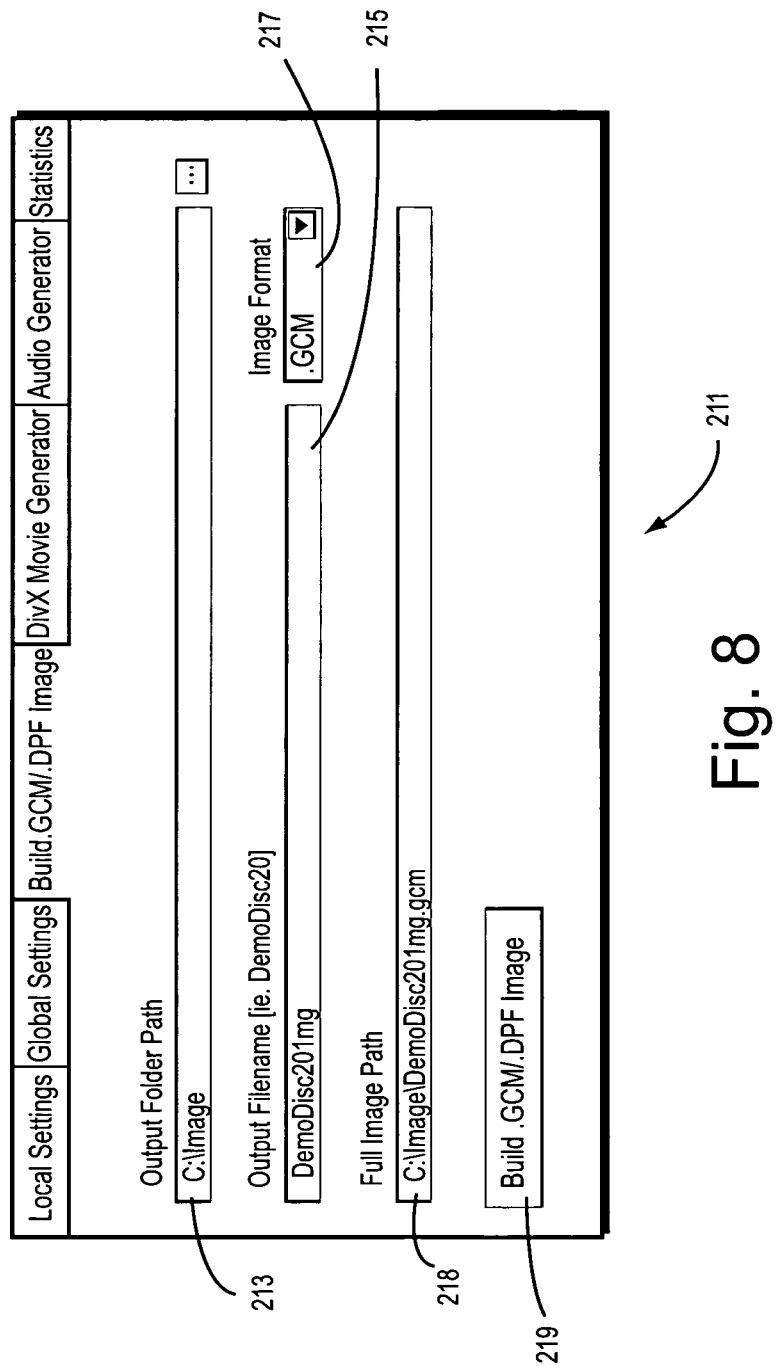
FIG. 8 is an example of a graphic interface of a build image tab of a program of an exemplary illustrative non-limiting implementation.

FIG. 8 shows an example of a graphic interface of a build image tab 211 of a program of an exemplary illustrative non-limiting implementation. In this illustrative non-limiting implementation, the user can enter the output folder file path in the output folder file path box 213. The user can also specify an output file name in the output file name box 215 and an image format in the image format selection box 217. A combination of the information from the first three boxes 213, 215, and 217 is shown in the full image path box 218. By clicking on the build image button 219, the user can build the disc image.

Figure 9:
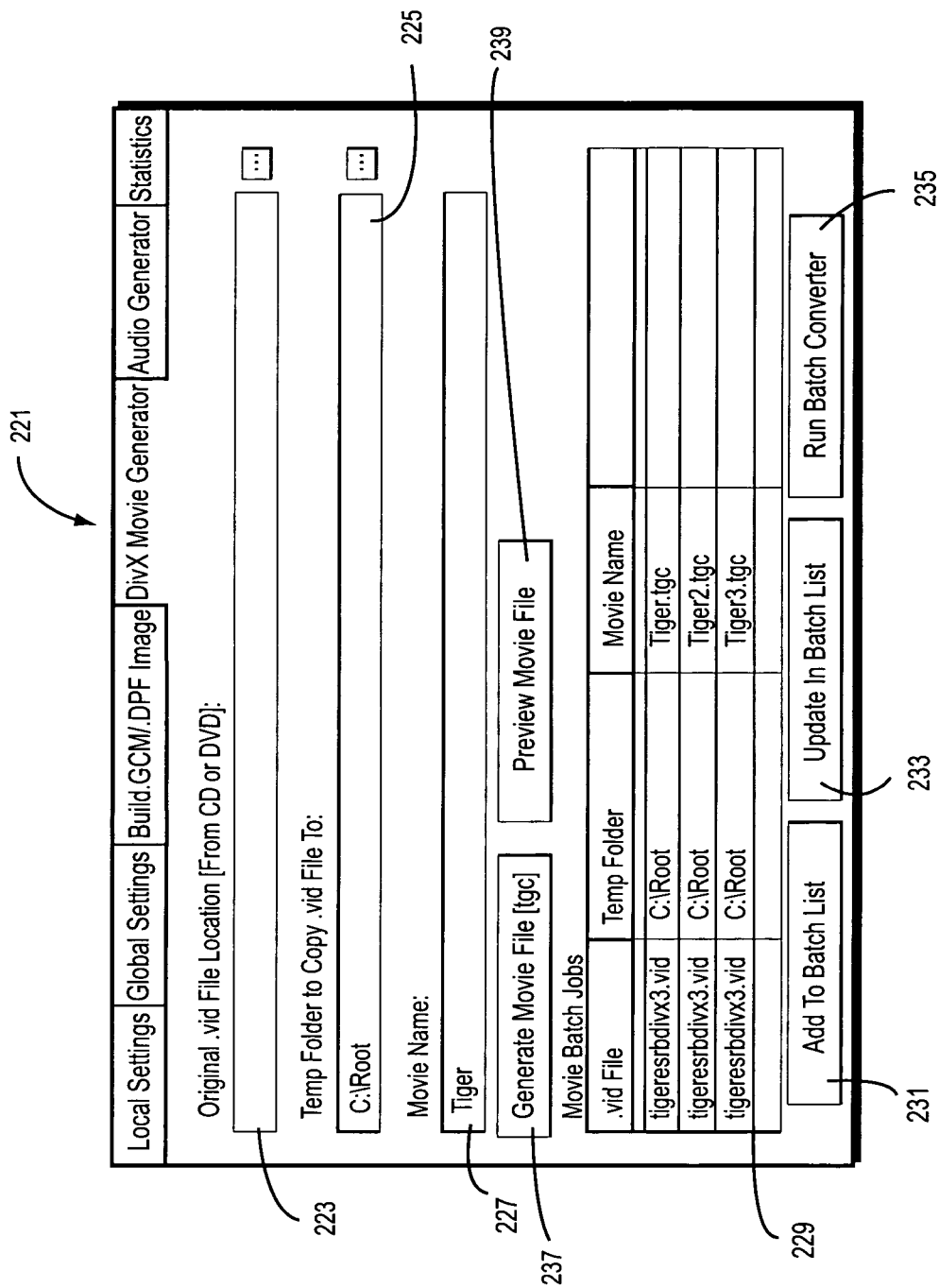
FIG. 9 is an example of a graphic interface of movie generate and preview tabs of a program of an exemplary illustrative non-limiting implementation.

FIG. 9 shows an example of a graphic interface 221 of a DivX® or other format movie generator tab of a program of an exemplary illustrative non-limiting implementation. In this exemplary illustrative non-limiting implementation, the user can specify and original file location in the original file location box 223. The user can also specify a temporary folder to copy a file to in the temp folder box 225. In the movie name box 227, the user can name the movie, and the user can click on the generate movie button 237 to generate the movie or the preview movie button 239 to preview the movie.

This exemplary illustrative non-limiting implementation also has a table of movie files 229 that will run when the user clicks the run batch converter button 235. If the user wishes to add a batch job to the list, the user can type the appropriate information into the table of movie files 229, and click the add to batch list button 231. If a movie file has been updated, the user can select the file that has been updated by left clicking on the file name in the table of movie files 229, and click the update in batch list button 233. This will update the updated movie file. If a user wishes to delete a movie file from the batch list shown in the table of movie files 229, the user can left click on the name of the movie file the user wishes to delete and press the delete key on the keyboard of the computer of the present exemplary non-limiting implementation.

Figure 10:
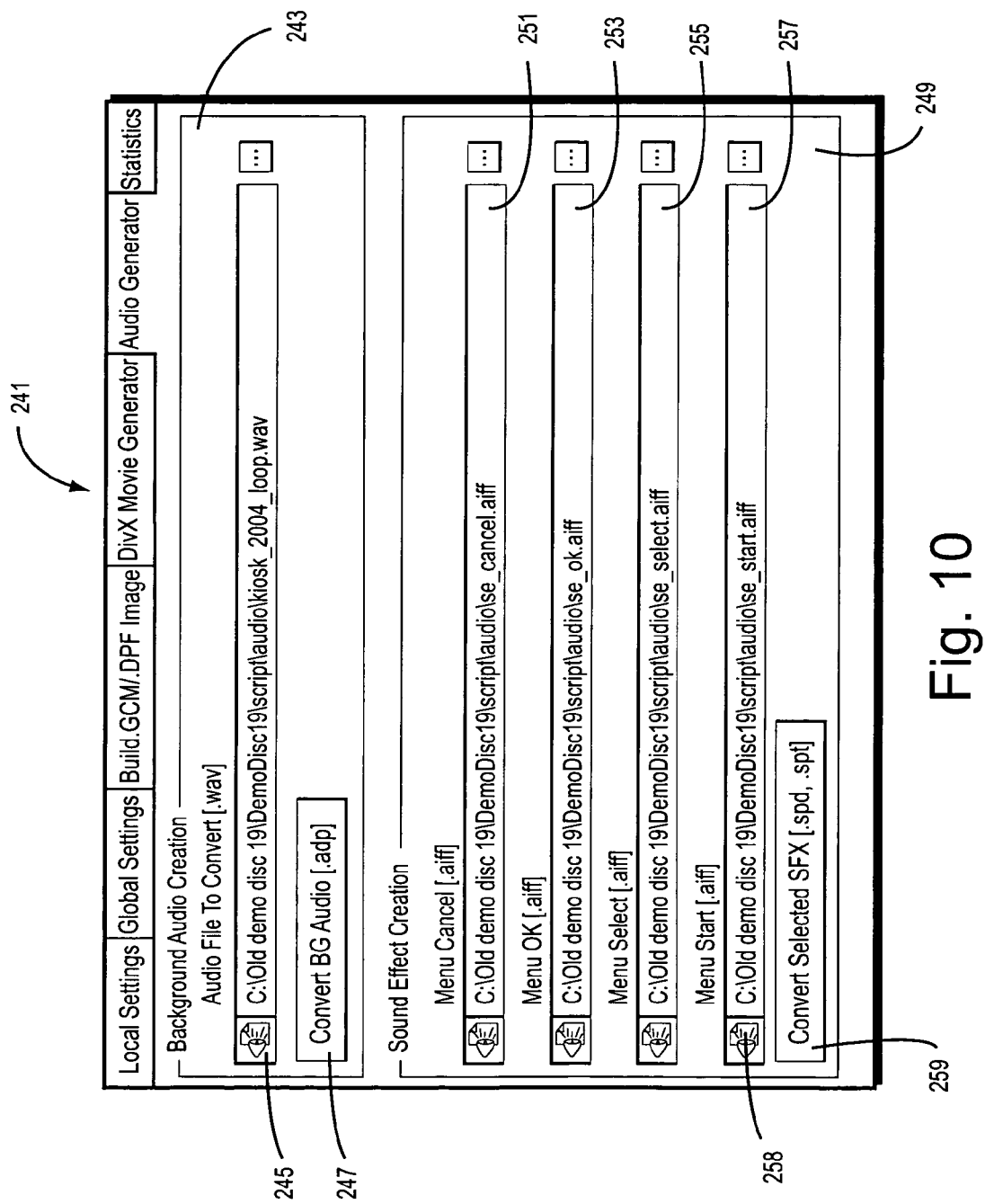
FIG. 10 is an example of a graphic interface of an audio generator tab of a program of an exemplary illustrative non-limiting implementation.

FIG. 10 shows an example of a graphic interface 241 of an audio generator tab of a program of an exemplary illustrative non-limiting implementation. The graphic interface of this exemplary illustrative non-limiting implementation has a background audio creation section 243, an audio file to convert box 245, a convert BG audio button 247, a sound effects creation section 249, a menu cancel sound box 251, a menu ok sound box 253, a menu select sound box 255, a menu start sound box 257, speaker icons 258 and a convert selected SFX button 259.

In this exemplary illustrative non-limiting implementation, the user can enter the name of the audio file to convert for background music in the audio file to convert box. By clicking the convert BG audio button 247, the entered file will be converted for the user.

In the sound effects creation section 249 of this exemplary illustrative non-limiting implementation, the user can specify several other sound effects to be converted. In this exemplary illustrative non-limiting implementation, the user can specify a menu cancel sound in the menu cancel box 251, a menu ok sound in the menu ok box 253, a menu select sound in the menu select box 255, and a menu start sound in the menu start box 257. By clicking on the convert selected SFX button, the specified sounds will be converted for the user.

The user can also click on the speaker icons 258, in this exemplary illustrative non-limiting implementation, to preview the entered sound.

Figure 11:
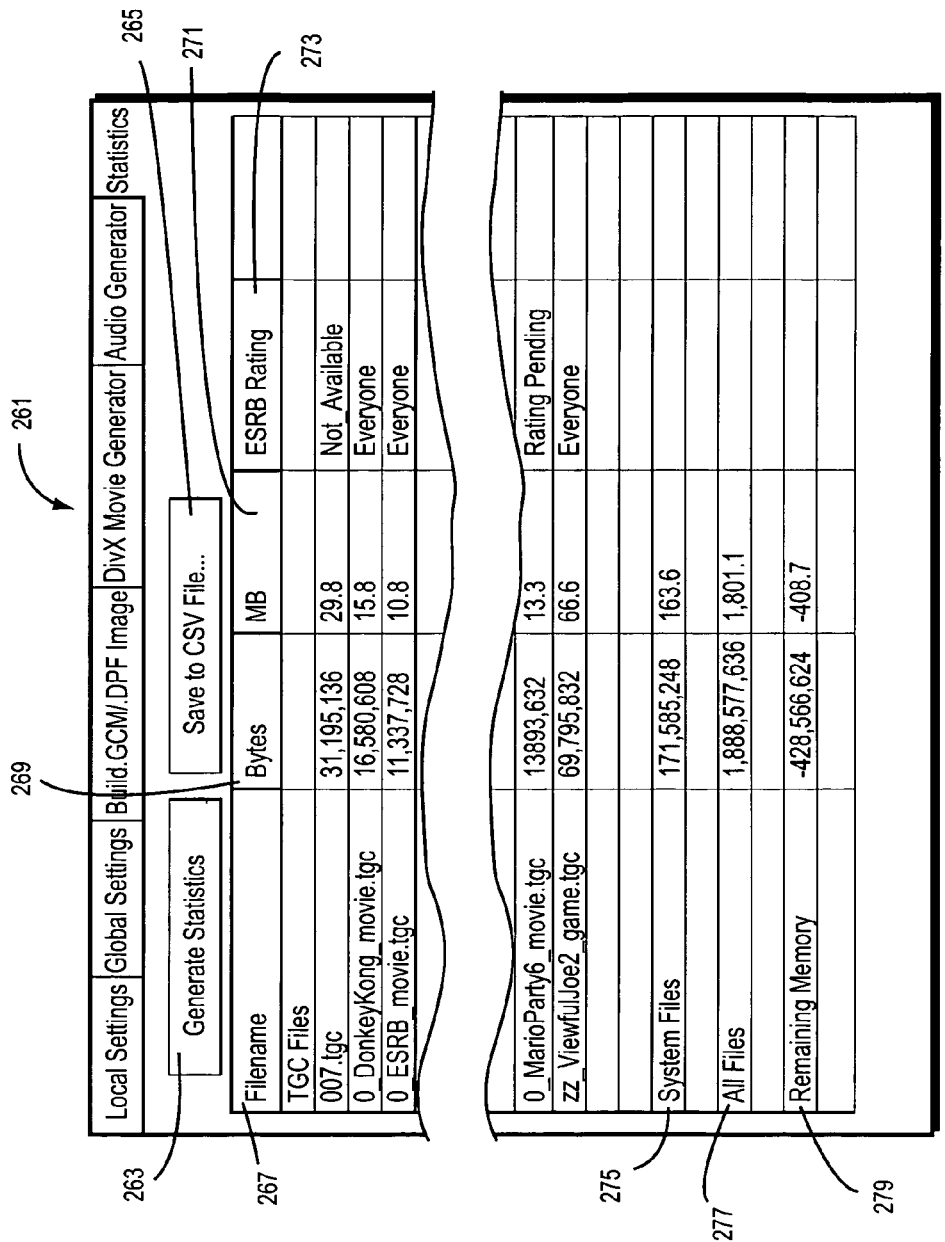
FIG. 11 is an example of a graphic interface of a statistics tab of a program of an exemplary illustrative non-limiting implementation.

FIG. 11 shows an example of a graphic interface of a statistics tab 261 of a program of an exemplary illustrative non-limiting implementation. In this exemplary illustrative non-limiting implementation the user can click a generate statistics button 263 to get a readout of the files. The user can also click the save to CSV file button 265 to save the statistics to a file. The statistics available in this exemplary illustrative non-limiting implementation include a filename 267 showing the name of a given file, a bytes size 269 showing the size of a given file in bytes, an MB size 271 showing the rounded size of the file in megabytes, and an ESRB rating 273, showing the ESRB rating, if any, for the file. A system files option 275 shows the total size in bytes and megabytes of the system files, and an all files option 277 shows the total size in bytes and megabytes of all the files. A remaining memory option shows the memory remaining for use, displayed as a negative number in red if the memory is over a certain size in this exemplary illustrative non-limiting implementation.

FIG. 12 shows another example of a graphic interface of an opening banner tab of a program of an exemplary illustrative non-limiting implementation.

Figure 13:
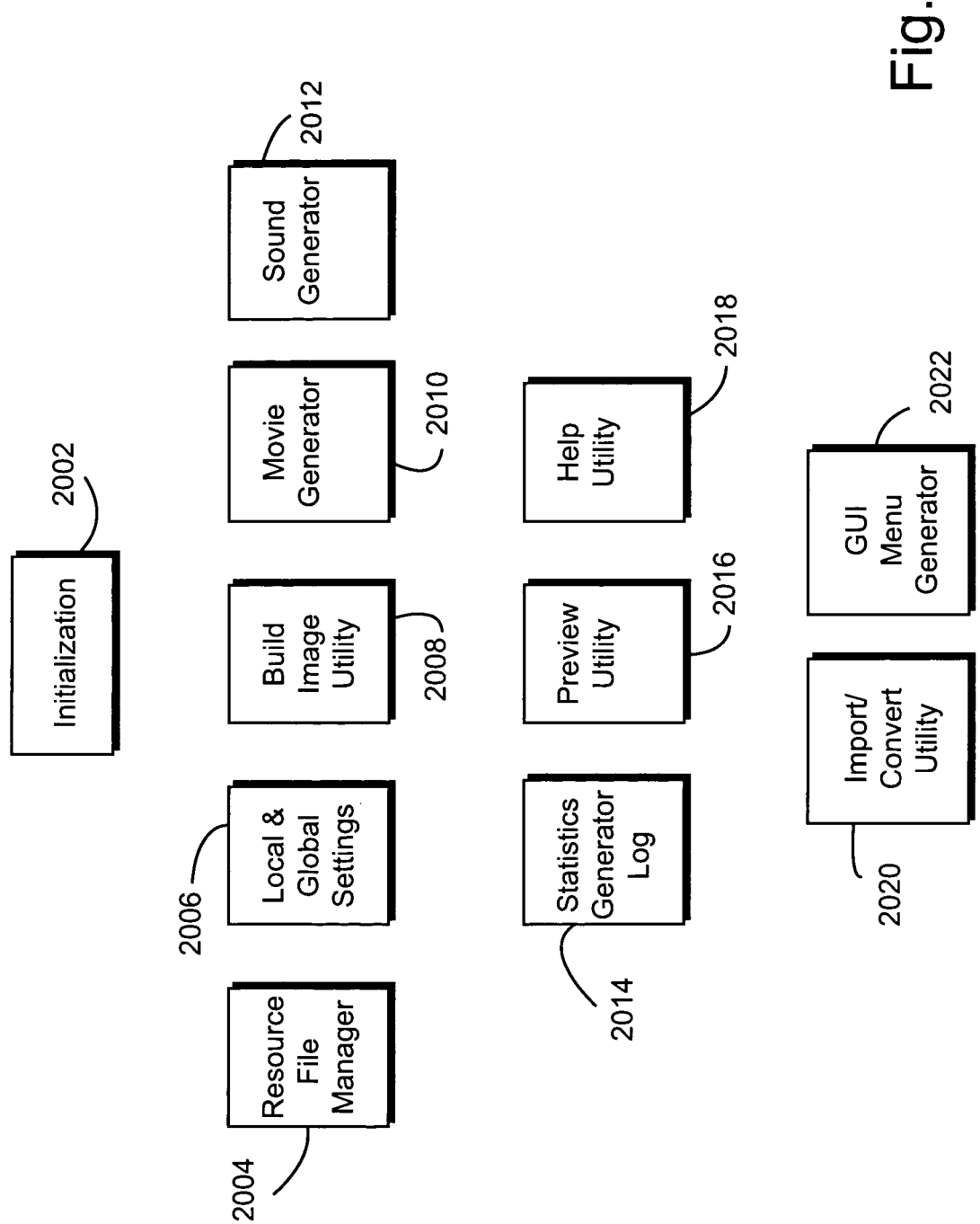
FIG. 13 is a schematic illustrative of an overall software architecture for the exemplary illustrative non-limiting implementation of the demo development tool.

FIG. 13 shows an exemplary illustrative non-limiting computer software architecture for an implementation of demo development tool 1112. In the exemplary architecture shown, the development tool 1112 is written in a conventional programming language such as C or C++ using topdown modular object-oriented programming techniques. The architecture shown may comprise the following functional software modules that are called from the various user interface features described above:

initialization (upon startup) 2002
resource file manager 2004
local and global settings manager 2006
build image utility 2008
movie generator 2010
audio generator 2012
statistics generator/logger 2014
preview utility 2016
help utility 2018
import/convert utility 2020
GUI menu generator 2022.

Figure 14:
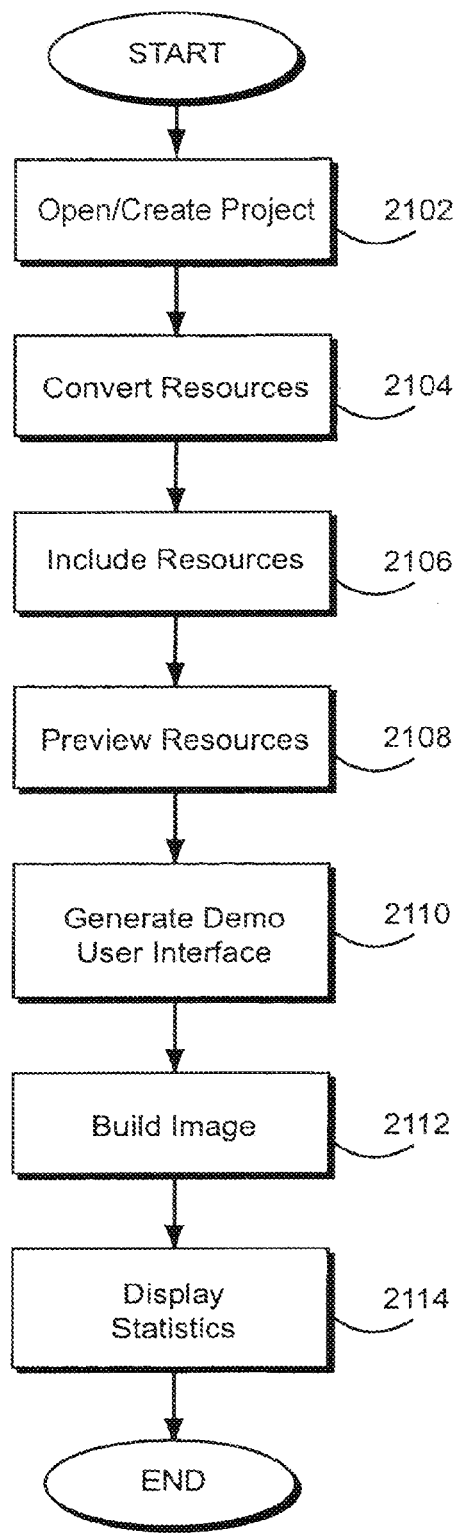
FIG. 14 is a flowchart of exemplary illustrative non-limiting program control steps.

FIG. 14 shows exemplary illustrative non-limiting program control steps. In one exemplary execution of tool 1112, the software opens and/or creates a project (block 2102). The tool 1112 then may convert resources as necessary (block 2104), and include resources specified by the author (block 2106). As explained above, such resources can include banner displays, audio clips, video or movie clips, executable game segments, and/or a variety of other multimedia elements.

The tool 1112 allows the user to preview any or all of the resources before the demo is built (block 2108). Various conventional viewers, players etc. may be used to provide such preview function. The tool 1112 may also allow the author to create a menu-driven or other demo user interface to allow the end user to select between different demo options (e.g., watch a movie clip, play the game, select between different demo games, etc.). (block 2110). Once the author is satisfied with the previews, he or she may control tool 1112 to build an image (block 2112) that can be performed or executed by the target viewing platform. The tool 1112 logs and may display statistics concerning disk storage utilization, etc. (block 2114). The tool 1112 may also "burn" the image onto an optical disk or other mass storage device, create a file for delivery over a network, or the like.

While the technology herein has been described in connection with exemplary illustrative non-limiting implementations, the invention is not to be limited by the disclosure. The invention is intended to be defined by the claims and to cover all corresponding and equivalent arrangements whether or not specifically disclosed herein.

We claim:

1. A method of creating an entertainment presentation for use on a video game playing platform, said method comprising:
   including and selecting resources comprising executable playable video game segments and reproducible movie clips for inclusion in said presentation;
   providing a menu driven user interface allowing an author to individually select and preview any or all of included said resources including said executable playable video game segments and said movie clips without first creating an integrated image;
   after said previewing, then building an integrated image including said executable playable video game segments for play on a video game playing platform and said movie clips resources converted into one or more formats for reproduction on the video game playing platform; and
   delivering said integrated image to said video game playing platform for playing by end users.

2. The method of claim 1 wherein said resources include audio clips.

3. The method of claim 1 wherein said delivering includes storing said integrated image on a portable mass storage device.

4. The method of claim 1 further including defining the project including opening and adding to a pre-existing project.

5. The method of claim 1 further including applying global and local settings.

6. The method of claim 1 further including logging and maintaining statistics.

7. The method of claim 1 further including automatically converting resources for inclusion in the integrated image.

8. An authoring station for creating an entertainment demonstration presentation for viewing on a video game playing platform, said authoring station comprising:

a resource file manager executed by at least one processor for defining a project and including and selecting resources including executable playable video game segments and movie clips within said project for inclusion in said demonstration presentation;

a menu driven preview utility executed by said at least one processor that allows an author to individually preview any or all of included said resources including said executable playable video game segments and said movie clips without building a demonstration integrated image; and a build image utility executed by said at least one processor that after preview, then builds a demonstration integrated image for play on a video game playing platform by converting said executable playable video game segments and said movie clips for play on said video game playing platform.

9. The system of claim 8 wherein said resources include audio clips.

10. The system of claim 8 further including a storage device that stores said integrated image on a portable mass storage device for delivery to said viewing platform.

11. The system of claim 8 wherein said defining resource file manager allows a user to open and add to a pre-existing project.

12. The system of claim 8 further including a manager that applies global and local settings.

13. The system of claim 8 further including a statistics logger.

14. The system of claim 8 further including a conversion utility that automatically converts resources for inclusion on said integrated image.

* * * * *